W. H. TAYLOR.
TOOL HOLDER.
APPLICATION FILED APR. 24, 1911.

1,011,667.

Patented Dec. 12, 1911.

Witnesses
O. B. Baenziger.
V. C. Spratt.

Inventor
William H. Taylor
By Parker & Burton
Attorneys

COLUMBIA PLANOGRAPH CO., WASHINGTON, D. C.

UNITED STATES PATENT OFFICE.

WILLIAM H. TAYLOR, OF FLINT, MICHIGAN.

TOOL-HOLDER.

1,011,667.   Specification of Letters Patent.   Patented Dec. 12, 1911.

Application filed April 24, 1911. Serial No. 622,918.

*To all whom it may concern:*

Be it known that I, WILLIAM H. TAYLOR, a citizen of the United States, residing at Flint, county of Genesee, State of Michigan, have invented a certain new and useful Improvement in Tool-Holders, and declare the following to be a full, clear, and exact description of the same, such as will enable others skilled in the art to which it pertains to make and use the same, reference being had to the accompanying drawings, which form a part of this specification.

This invention relates to tool holders.

It has for its object an improved tool holder adapted to adjustably hold a lathe tool therein and to be itself held in position in the ordinary tool post.

Figure 1:
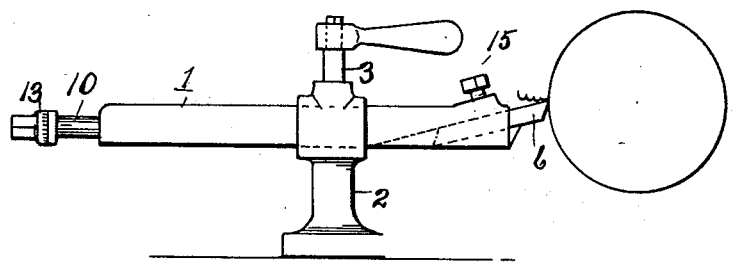
Figure 2:
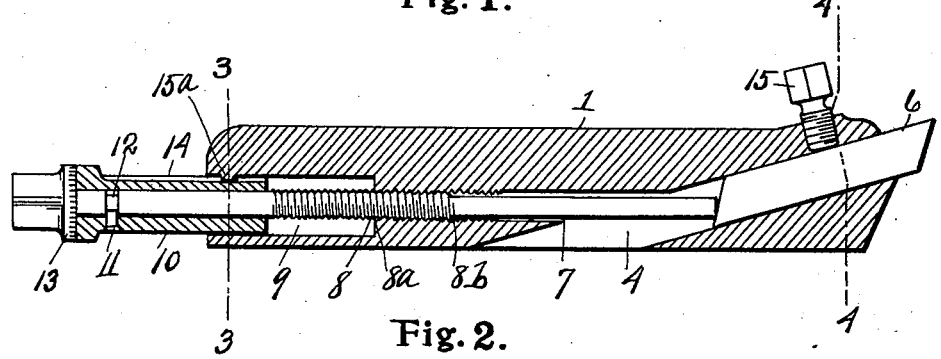
Figure 3:
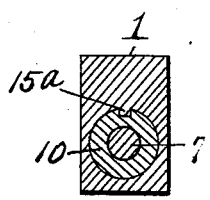
Figure 4:
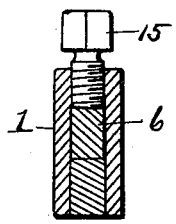

In the drawings:—Figure 1, is an elevation in a tool post. Fig. 2, is a longitudinal section of the tool. Fig. 3, is a cross section at the line 3—3 of Fig. 2. Fig. 4, is a cross section at the broken line 4—4 of Fig. 2.

The tool comprises the shank 1 adapted to engage in the tool post 2 of a lathe and to be secured therein by a set screw 3. The tool is provided with a diagonal slot 4 that traverses the shank 1 from the front to the bottom of the shank, (considering that part the bottom which lies lowest when the tool is in position in the post). From the slot 4 which serves as a guide way for the bit 6, (the hardened cutting bit) of the structure, a passage 7 extends to the rear of the tool which for a part of its length is threaded for an adjusting screw 8. In front of the threaded part, which extends from 8ᵃ to 8ᵇ, there is clearness for the free action of the shank of the screw 8 and at the rear of the threaded part is a cylindrical opening 9 in which engages a sleeve 10, sleeved on the shank of the screw 8 and held to slide as the screw advances by a pin 11 that engages through a sleeve into an annular race 12 on the shank of the screw. The head of the screw terminates with a graduated head 13 by means of which the screw is turned.

The sleeve 10 is provided with a key way 14 in which engages a key 15ᵃ that projects into it from the shank 1. The key 15ᵃ allows the sleeve 10 to slide but prevents it from turning with the screw 8. The short pin 11 requires the sleeve to slide with the shank of the screw 8 and maintains the graduated head 13 always in proper relation to the end of the sleeve which is provided with an index line (not shown). The cutting bit member 6 slides in the rectangular slot 4 driven forward by the screw, driven backward by a pressure on the end of it and held in position by set screw 15 which engages through the shank and against the bit 6.

The particular use of this adjustable tool holder is in connection with the tool carriage as a secondary or auxiliary tool to furnish, in a second tool post mounted on the carriage, a tool, which may be accurately and quickly adjusted with reference to the work and to the primary tool held on said carriage. Carriages with the secondary tool posts are in common use and the primary tool is easily adjusted by ordinary and well known methods, but the secondary tool which it is sometimes very desirable to use in connection with the primary tool is only adjustable by trial, so far as I am at present advised and the especial object of this invention is to produce a tool which may be adjusted through its holder to a limited degree to bring about that close adjustment between itself and another tool that is necessary for quick and accurate work where both tools are used.

What I claim is:—

A tool holder for lathe work, comprising a shank having a slot for holding the cutting bit therein, a sleeve slidable in an opening in said shank, a screw rotatable in said sleeve, engaging in said shank and against the cutting bit, and a graduated head on said screw revoluble against one end of said slidable sleeve, substantially as described.

In testimony whereof, I sign this specification in the presence of two witnesses.

WILLIAM H. TAYLOR.

Witnesses:
 CHARLES F. BURTON,
 VIRVINIA C. SPRATT.

Copies of this patent may be obtained for five cents each, by addressing the "Commissioner of Patents, Washington, D. C."